(12) United States Patent
Ema

(10) Patent No.: US 6,590,599 B2
(45) Date of Patent: Jul. 8, 2003

(54) APPARATUS AND METHOD FOR EQUIVALENTLY CHANGING A WRITE CLOCK FREQUENCY

(75) Inventor: Hidetoshi Ema, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/797,574

(22) Filed: Mar. 5, 2001

(65) Prior Publication Data

US 2002/0158965 A1 Oct. 31, 2002

(30) Foreign Application Priority Data

Mar. 3, 2000 (JP) ........................................ 2000-058301

(51) Int. Cl.[7] .............................. B41J 2/435; B41J 2/47
(52) U.S. Cl. ...................... 347/250; 347/235; 347/252
(58) Field of Search ................................. 347/240, 234, 347/235, 248, 249, 250, 252, 247, 253, 254; 358/296

(56) References Cited

U.S. PATENT DOCUMENTS

| | | | | |
|---|---|---|---|---|
| 4,862,289 A | * | 8/1989 | Shimada | 347/247 |
| 5,477,330 A | * | 12/1995 | Dorr | 358/296 |
| 5,933,184 A | * | 8/1999 | Ishigami et al. | 347/249 |

* cited by examiner

*Primary Examiner*—Hai Pham
(74) *Attorney, Agent, or Firm*—Oblon, Spivak, McClelland, Maier & Neustadt, P.C.

(57) ABSTRACT

An image forming apparatus includes a semiconductor laser that irradiates a laser beam modulated based on an image modulation signal, a scanning device that scans an image carrier with the semiconductor laser beam, and a pixel clock generating device that generates a pixel clock that controls the laser beam. The pixel clock includes a plurality of pulses having a prescribed normal width constituted by a prescribed number of fractions (N), and substantially periodically includes one or more pulses having a greater width constituted by a number of fractions of (N) plus (M).

18 Claims, 23 Drawing Sheets

PULSE-MODULATION UNIT

FIG. 9

QD3: SELECTION PULSE

APPARATUS AND METHOD FOR EQUIVALENTLY CHANGING A WRITE CLOCK FREQUENCY

CROSS REFERENCE TO RELATED APPLICATIONS

This document claims priority under 35 U.S.C. §119 to Japanese Patent Application No. 2000-058301 filed on Mar. 3, 2000, the entire contents of which are hereby incorporated herein by reference.

BACKGROUND OF THE INVENTION

1. Field of the Invention

The present invention generally relates to an image forming apparatus, such as a laser printer, a digital copier, a laser facsimile, etc., and in particular, relates to a control and modulation device capable of controlling and modulating a light output of a semiconductor laser provided in the image forming apparatus.

2. Discussion of the Background

As background arts related to the present invention, Japanese patent application laid open nos. 05-075199, 05-235446, and 09-321376 describe technologies related to semiconductor laser beam (hereinafter simply referred to as laser) modulation. According to these publications, a light-electric negative feedback loop is formed so as to control a semiconductor laser at a high speed. Specifically, a prescribed current is induced by a light receiving element that monitors a light output of the semiconductor laser, and is always compared with a light generation instruction current. A prescribed amount of current is then carried to the semiconductor laser in proportion to that of the light generation instruction current in addition to an output current of the light-electric negative feedback loop. Thus, high speed modulation can be realized while suppressing adverse effects of temperature and droop characteristics of the semiconductor laser.

However, when a light output of a semiconductor laser is small, due to characteristics of the light receiving element, linearity of a light reception current output is remarkably deteriorated when compared with a light input. Thus, since control precision is inferior, a light is output in excess of a predetermined amount. As a result, an adverse effect appears in a laser printer or similar image forming apparatus (e.g., a dirty copy is made). In addition, since a control unit should normally be operated so as to always control a light output, a light output can not perfectly be turned OFF. As a result, an offset light generally arises. In addition, since a special circuit is needed in a laser printer or the like to set a predetermined amount of a driving current added to a semiconductor laser, a circuit scale of a light modulation IC should be limited when a function thereof is improved. In addition, when a semiconductor laser array or the like, which detects a plurality of outputs of laser beams with only one light receiving element, is utilized, an external device which separates and detects each of the light outputs should be provided.

A construction of one example of a background image forming apparatus is now described with reference to FIG. 20. As shown in FIG. 20, a laser beam is output from a semiconductor laser unit 134 and is deflected by a polygon mirror 135 when the polygon mirror 135 rotates. The laser beam scans a photo-conductive member (hereinafter referred to as a PC member) via an fθ lens 136 and forms a latent image when the PC member 137 is exposed therewith. The semiconductor laser unit 134 controls formation of the latent image on the PC member 137 by controlling a light emission time period of the semiconductor laser in accordance with both of pixel data, which is generated by an image data processing unit 131, and a pixel clock having a prescribed phase, which is set by a phase synchronous circuit 139. In addition, the phase synchronous circuit 139 sets a prescribed phase to a clock generated by a clock generation circuit 132 so that the clock can synchronize with detection of a photo detector 138 that detects the laser beam deflected by the polygon mirror 135.

In general, the laser drive circuit 133, the phase synchronous circuit 139, and the clock generation circuit 132 are generally necessarily included in an image forming apparatus when a laser scan optical unit is employed and positional and interval precision of a latent image are obtained on the PC member 137.

However, since many clocks having the same frequency with a pixel clock are required in an image forming apparatus, a problem of electromagnetic interference generally arises.

In addition, since a number of parts increases, the image forming apparatus is costly. In addition, as a printing speed increases, a plurality of pixel clocks (as image data transfer tools) hardly operate at the same timing in an entire system, and data is generally transferred in parallel with a slowest clock.

Further, as a laser printer is operated at a higher speed and an image is printed with higher density, a system that includes a plurality of light sources is increasingly adopted. For example, a plurality of semiconductor lasers and a laser diode array are utilized as a light source. In addition, either one is preferably selected in consideration of an entire system. However, since a light receiving element is commonly utilized by all of semiconductor lasers when the LD array is utilized, a system proposed in the noted publications (i.e., Japanese patent application laid open nos. 05-075199, 05-235446, and 09-321376) can not be utilized, resulting in a high cost. In addition, as proposed in the publications (i.e., Japanese patent application laid open nos. 05-075199, 05-235446, and 09-321376), to avoid adverse effects of temperature and droop characteristics of a semiconductor laser, a prescribed control is continuously required.

However, an offset light concurrently arises with the continuous control. In addition, a circuit scale is large due to a current set circuit or similar devices. Also, a special device that separately detects each of light outputs is externally necessitated when a semiconductor laser array is utilized. Further, a beam profile of a semiconductor laser is generally similarly designed to a Gaussian distribution, and a latent image is formed in accordance with the Gaussian distribution in an electro-photographic system. Thus, the latent image does not appear in a binary state and a portion of analog like distribution arises when resolution is increased. This generally easily introduces influence of an external change such as a change in a developing bias, resulting in a change in density of an image.

For example, Japanese patent application laid open no. 11-167081 proposes a technology in which a frequency of a pixel clock can be set and changed by a direct synthesizer at a high speed. Specifically, frequency fractionation is changed by changing data of a look-up table (LUT). However, such changeable frequency fractionation and an output frequency changed speed generally give limitation on a total construction design due to close relation thereof to a phase locked loop control, which is described later in detail, and a low bandpass filter. In addition, since the frequency fractionation depends upon both of a master clock frequency and a number of bits of the LUT, it is necessary to increase a circuit scale or to increase a speed of the master clock. As a result, the above-described elements are typically not made into one chip.

In addition, a system proposed in Japanese patent application laid open no. 5-207234 in which a phase error is added to a PLL, generally produces a frequency error in a pixel clock unless a signal related to phase error addition is abnormally stable. This can also be an obstacle when both of digital and analog circuits are integrated on the one chip.

SUMMARY OF THE INVENTION

Accordingly, an object of the present invention is to address the above and other problems and provide a novel image forming apparatus.

The above and other objects are achieved according to the present invention by providing a novel image forming apparatus which includes a semiconductor laser that irradiates a laser beam modulated based on an image modulation signal, a reference clock generating device that generates a reference clock, and a pulse modulation device that generates a modulation pulse constituting the image modulation signal per one pixel from the reference clock and pixel data. In addition, the image modulation pulse includes at least a symmetrical thin pulse series.

In another embodiment, the image modulation pulse includes a thin center pulse between the symmetrical thin pulse series.

In yet another embodiment, a pixel clock generating device may be provided to generate a pixel clock that controls the laser beam. In addition, the pixel clock may include a plurality of pulses having a prescribed normal width constituted by a prescribed number of fractions (N), and substantially periodically include one or more pulses constituted by a greater width than the normal width. In addition, the greater width may be constituted by a number of fractions of (N) plus (M).

In yet another embodiment, a gradation error caused by a difference in fraction numbers (M) may be detected and diffused to one or more ambient pixels when the ambient pixels are digitized.

In yet another embodiment, the semiconductor laser is turned OFF during a time period corresponding to the fraction numbers (M) when the number (M) is positive.

In yet another embodiment, an intensity of the semiconductor laser may be increased during a time period corresponding to the fraction number (N) plus (M) when the number (M) is negative.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 9 is a chart illustrating a modification of a reference table (look up table) illustrated in FIG. 3, wherein a number of bits is decreased according to the present invention;

DETAILED DESCRIPTION OF THE PREFERRED EMBODIMENTS

Figure 1A:
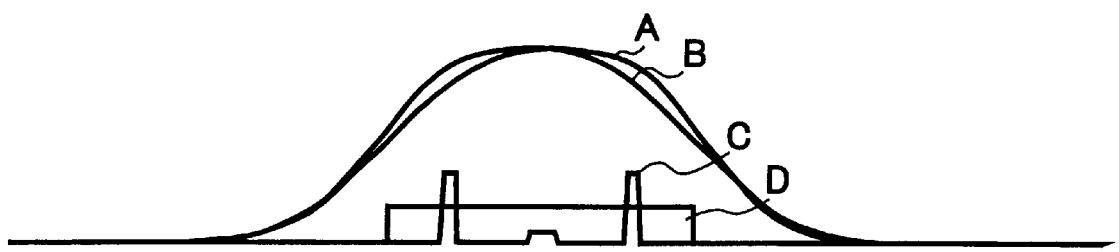
FIGS. 1A and 1B are charts respectively illustrating relations between light modulation pulses and exposure energy distributions of background technology and the present invention.

Referring now to the drawings, wherein like reference numerals and marks designate identical or corresponding parts throughout several views, the present invention is now described.

The first embodiment is now described with reference to FIG. 1 which illustrates a relation between a light modulation pulse and an exposure energy distribution.

Figure 1B:
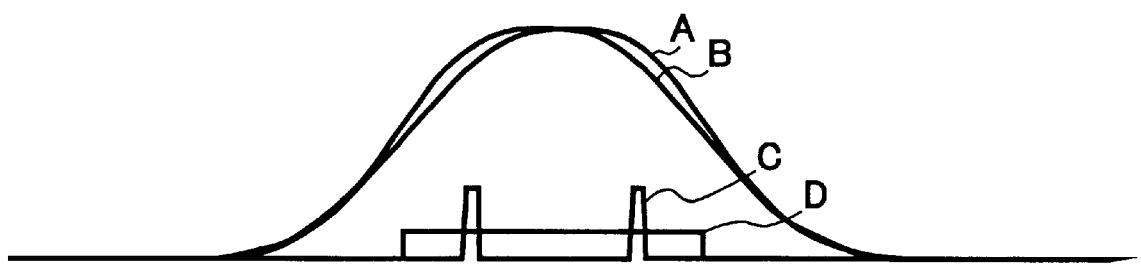

In FIG. 1A, (D) denotes one example of a background light modulation pulse. (B) denotes an exposure energy distribution when a beam profile has a Gaussian distribution. An optical pulse (C) may be of the present invention, which produces an exposure energy distribution (A) when such a pattern is utilized during exposure in the same optical unit as the background one. FIG. 1B illustrates another relation between light modulation pulses and exposure energy distributions when the background light pulse width is narrowed, and a pattern of a light modulation of the present invention is correspondingly changed.

Figure 2A:
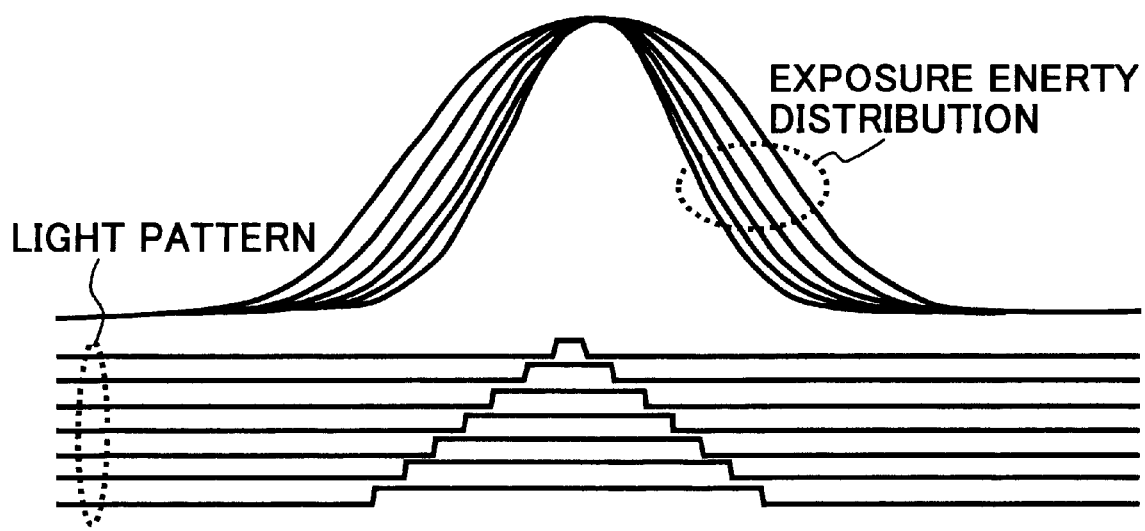
FIGS. 2A and 2B are charts respectively illustrating relations between varied light modulation pulses and exposure energy distributions of background technology and the present invention.
Figure 2B:
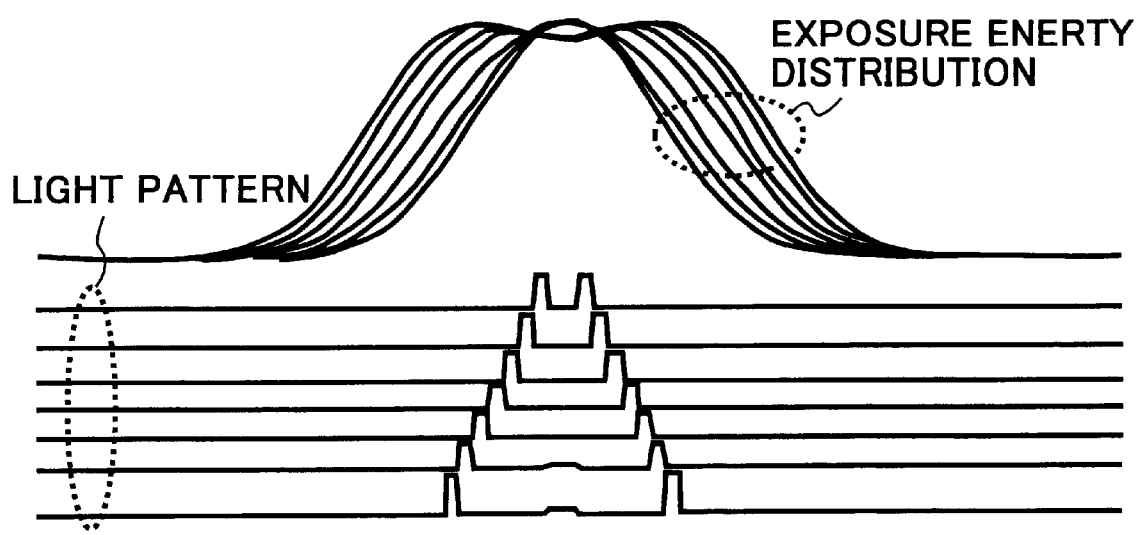

FIGS. 2A and 2B respectively illustrate an exposure energy distribution when a light modulation pattern is changed. Specifically, FIG. 2A illustrates exposure energy distributions when a pulse width of a background modulation light is varied. FIG. 2B illustrates exposure energy distributions when a pulse width is varied using a light modulation pattern of the present invention. The light modulation pattern of FIG. 2B may be formed by combining the first light pulse series, which is thin and symmetrical such as distribution (C) of FIGS. 1A and 1B, with the second pulse which lightens a laser beam at a center of the pulse series. An interval of the first pulse series may be narrowed when an exposure energy distribution is made thin. The interval of the first pulse series may be expanded when an exposure energy distribution is made wide. In the later case, the second pulse may suppress decreasing in exposure energy at the center of the exposure energy distribution. As noted from these figures, when exposure is performed using the above noted light modulation pulses of the present invention, an optical beam diameter can be obtained thinner than that illustrated in FIGS. 1A and 1B by about 20%. As a result, an exposure energy distribution can be steep. In addition, since a prescribed PC surface potential distribution can be obtained in a similar manner to that obtained by decreasing a beam diameter, an image can have a fair granularity (i.e., signal/noise ratio). In addition, the above-described laser beam modulation can widely be applied to other devices such as an optical disk in which a laser beam irradiation objective rotates.

Figure 3:
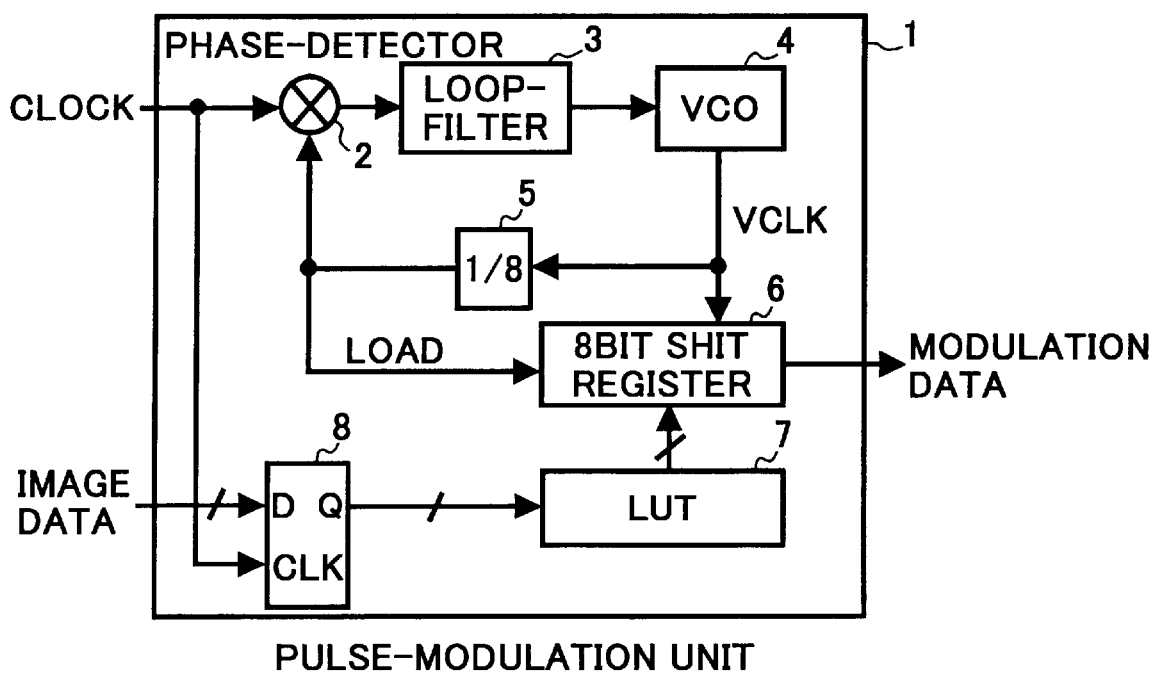
FIG. 3 is a block chart illustrating one example of a modulation data generation device that generates modulation data for generating a series of light pulses.

FIG. 3 illustrates a block chart for illustrating one example of a pulse modulation unit 1 for generating the above-described pulse series. FIG. 4 illustrates one example of modulation data output by the modulation data generation unit 1. As noted from FIG. 3, a clock that transfers pixel data may be input to a modulation data generation unit 1. Pixel data may be input thereto and is then converted by a look-up table (LUT) 7 into prescribed data in accordance with a modulation pulse series. The prescribed data may then be loaded into a shift register 6 responsive to a load signal. A PLL may output a control clock (VCLK). Modulation data may be output in accordance with the VCLK. The PLL may include a phase detector 2, a loop filter 3, a voltage control oscillator (VCO) 4 that generates VCLK having a frequency of eight times of the input clock, and 1/8 frequency divider 5.

Figure 4A:
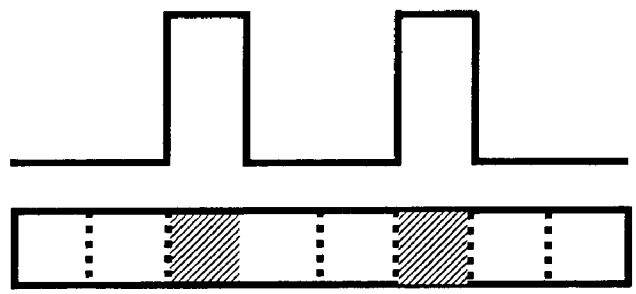
FIGS. 4A and 4B are charts respectively illustrating one example of a modulated data pattern output by the modulation data generation device illustrated in FIG. 3.
Figure 4B:
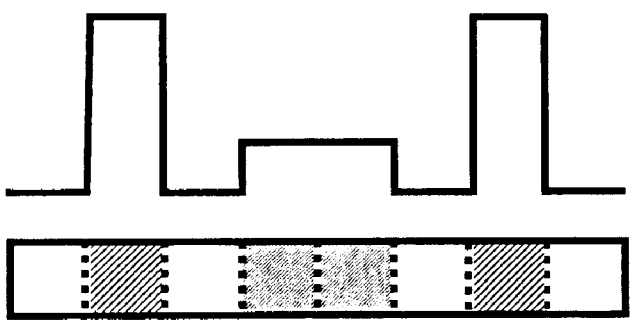

Data illustrated in FIG. 4A may produce the light modulation pulse (C) of FIG. 1A. Data illustrated in FIG. 4B may produce the light modulation pulse (C) of FIG. 1B. Since the pixel data is converted by the LUT 7, one of light modulation pulses of FIGS. 1A and 1B can optionally be selected using the same circuitry only by changing contents of the LUT 7 even when a laser scanning optical unit is replaced. In addition, an image having a fair granularity can be obtained.

Figure 5:
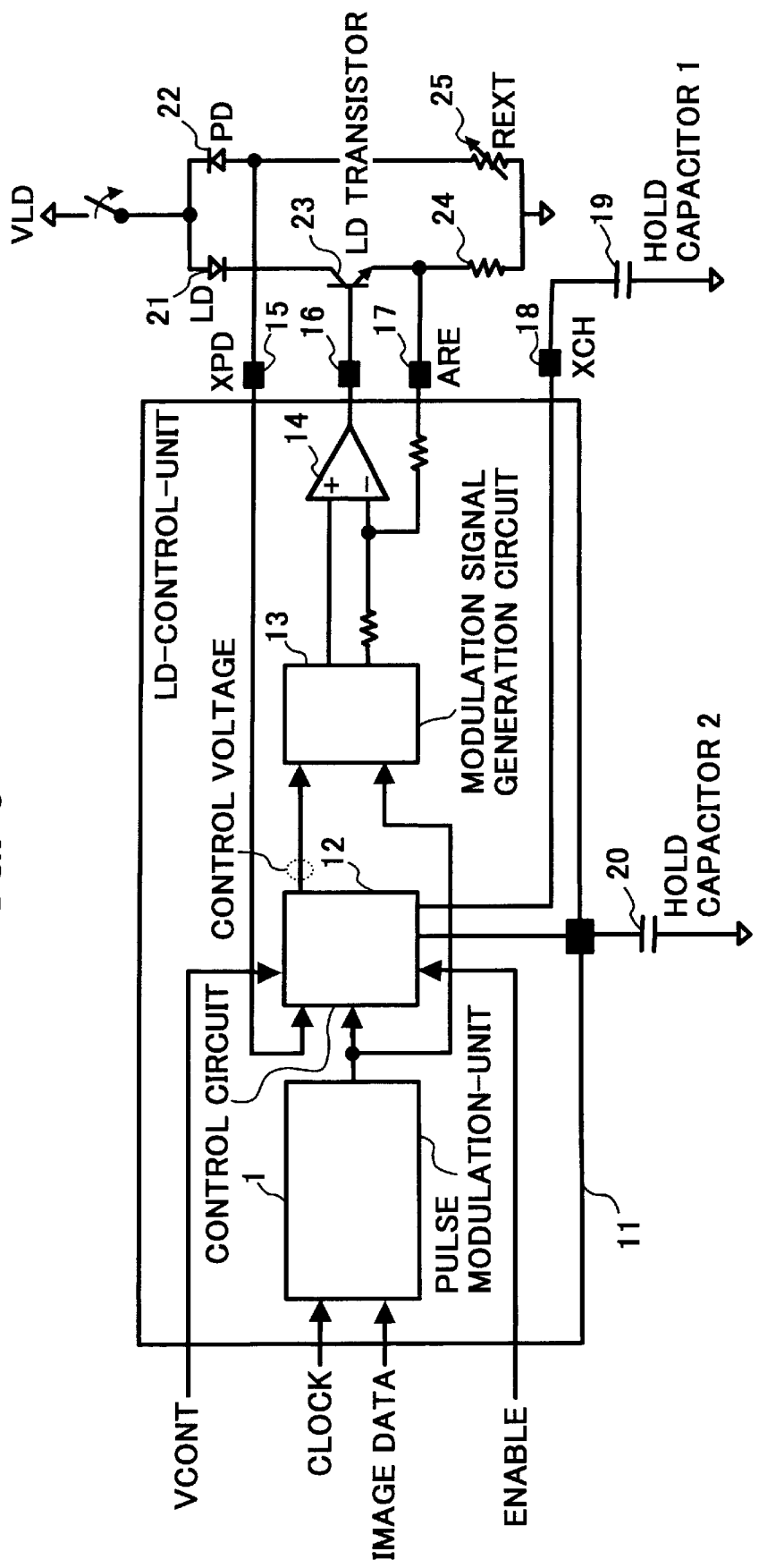
FIG. 5 is a block chart illustrating a semiconductor laser control and modulation circuit for controlling and modulating a semiconductor laser in accordance with data transferred from the pulse modulation unit illustrated in FIG. 3.

One example of modulation control performed in a semiconductor laser responsive to modulation data output from the pulse modulation unit 1 is now described with reference to FIG. 5. When an optical output includes a value (PO), a light receiving element (PD 22) receives a light beam from a semiconductor laser (LD 21) and outputs a prescribed amount of a current. The prescribed amount of current may be converted into a prescribed amount of a voltage via a resistor REXT 25. A control circuit 12 may detect the voltage at terminal XPD 15, and compare the prescribed amount of voltage with a reference voltage VCONT. A hold capacitor 19 may be connected to a terminal XCH 18 and hold a control result. When an optical output includes a value (P1), substantially the same control may be performed and a result thereof may be held by a hold capacitor 20. Assuming that an optical output linearly varies between voltages of both of P0 and P1, the optical output may be modulated in a multi-step fashion. Owing to I-L (current-light) characteristics, the linearity can practically precisely be established.

A prescribed amount of a semiconductor laser drive current (In) may be obtained by the following formula. In={(V0−V1)×Dn+V1}÷RE, wherein (Dn) represents a modulation data value (that varies responsive to a speed of a VCLK), (In) represents an amount of a semiconductor laser drive current, V0 and V1 represent voltages of hold capacitors 19 and 20, respectively, RE represents a resistor value, and P1=P0÷2. For example, the control circuit 12 and a modulation signal generation circuit 13 may be designed so that (Dn) varies from minus one to plus one.

Even though the VCLK, which has a frequency of eight times that of the input clock, is generated from the input clock in the above-described embodiment, a pixel clock itself generally is produced from a reference clock. In such a situation, since an exposure positional deviation appears due to chromatic aberration of an optical unit (e.g. fθ lens) depending upon an oscillation wavelength, a prescribed pixel clock generation circuit is generally necessitated so as to finely adjust a pixel clock. However, the PLL generally accumulates a jitter twice, and accordingly is costly. To this end, the second embodiment resolves such a problem.

Figure 6:
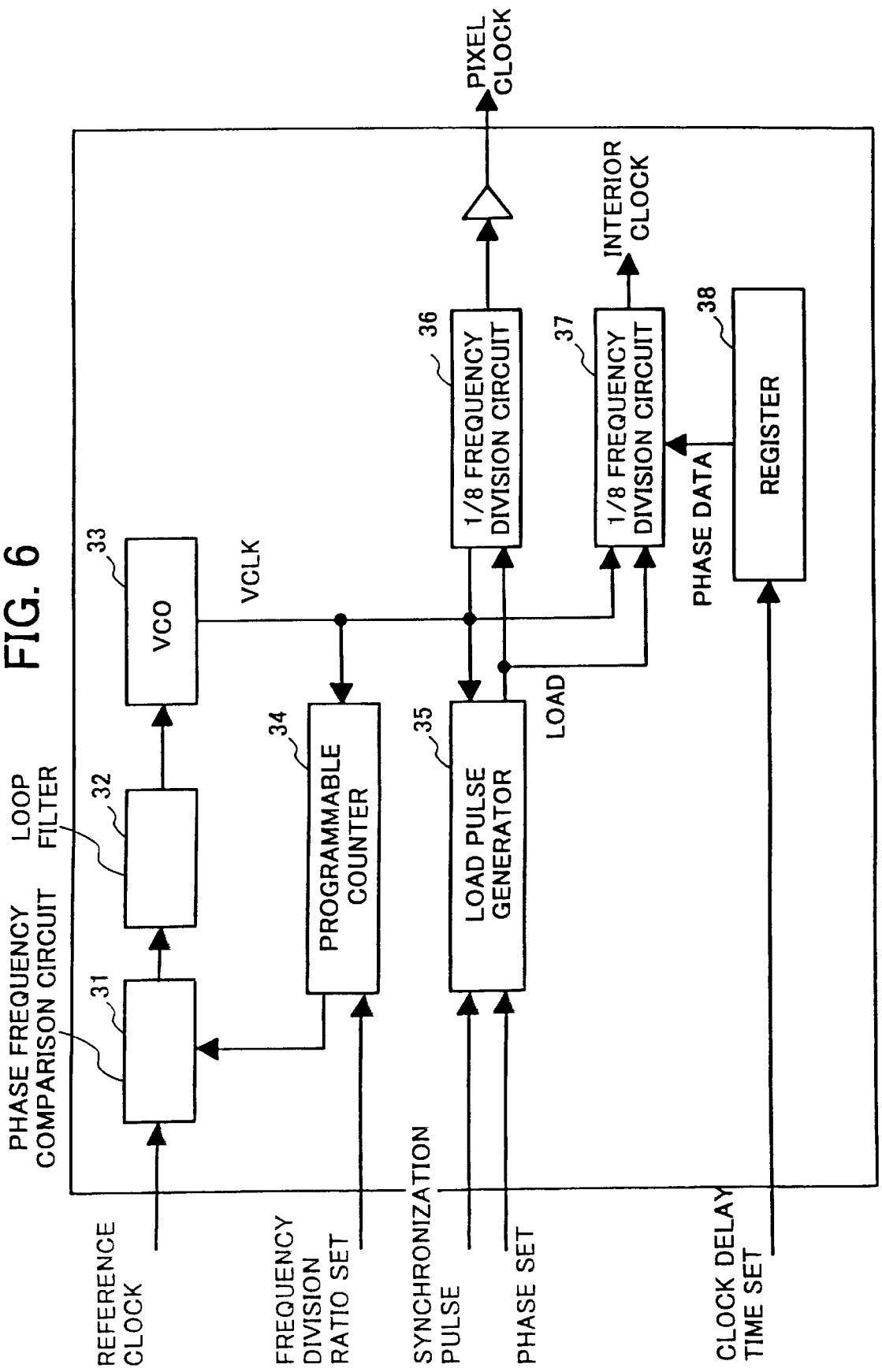
FIG. 6 is a block chart illustrating one example of a clock generation device for generating both of VCLK and pixel clocks.

The second embodiment is now described with reference to FIG. 6. As noted from FIG. 6, a PLL may generate a VCLK. The PLL may include a programmable counter 34 that divides a frequency of a VCLK by N times, a phase frequency comparison circuit 31 that compares the divided frequency of the VCLK with a reference clock, and a loop filter 32 that filters an output of the phase frequency comparison circuit 31. A VCO 33 may also be included in the PLL to output the VCLK at a prescribed variable oscillation frequency based on an output voltage of the loop filter 32. A division ratio N may externally be set to the programmable counter 34. A pixel clock synchronized with a phase synchronous pulse and including a frequency of 1/8 of the VCLK may then be generated when data "0", for example, may be loaded to an 1/8 frequency divider 36 by the VCLK and the phase synchronous pulse.

In addition, an 1/8 frequency divider 37 may be provided so as to accept a prescribed phase data at substantially the same timing with the load signal "0" and generate an internal clock having a prescribed phase difference from the pixel clock. The 1/8 frequency divider 37 can be omitted when a pixel clock is slow or a time delay can be disregarded when image data is transferred from an image data processing unit to a clock generation circuit. However, the 1/8 frequency divider 37 may be necessary when a frequency of a pixel clock is high. This is because a time delay from when a pixel clock is output to when image data is input cannot be disregarded while the image data synchronized with an output of the pixel clock is input, and accordingly, pixel data cannot correctly be input. In addition, a phase of the internal clock may relatively be varied to an output pixel clock based on a prescribed preset phase data so that the above-described problem can be effectively resolved.

In addition, counting (i.e., frequency division) performed by the ⅛ time frequency dividers 36 and 37 may selectively be enabled and disabled by a phase set signal. Specifically, a counting operation may be stopped by one clock cycle of a VCLK by catching a rising edge of the phase set signal with the VCLK so as to expand a width of a pixel clock by a prescribed amount (e.g. M value). Thus, phases of both the pixel clock and internal clock can be delayed by a fraction of one eighth of the clock. A frequency of the pixel clock can finely equivalently be adjusted when such phase delay of one eighth clock cycle is performed with a prescribed interval during one scanning time period. This may be equivalent to that frequency change steps can more finely be set than by the PLL.

To practically finely set frequency change steps, a frequency division range of the programmable counter 34 is widely set and a frequency of a reference clock is lowered or that of VCLK is increased. However, when a frequency of the VCO 33 is lowered, a change in a frequency of the VCLK can be detected only at a reference clock cycle. As a result, it raises a large technical object to be achieved. When a frequency of the VCLK is increased, an oscillation frequency of the VCO 33 should be increased and it also raises a technical object to be achieved. According to the present invention, if a frequency of the VCLK can be increased, a frequency higher than that can be set. In addition, if an oscillation frequency of the VCO 33 can be stable, a frequency higher than that can be set. Further, when a semiconductor laser is designed to be turned OFF during one eighth clock cycle which is created by a phase set signal as a phase delay, a discontinuity of an exposure energy (i.e., image density) can sufficiently be avoided.

Such a phase set signal can be set when the semiconductor laser is turned OFF (i.e., at a timing corresponding to a blank portion on an image). Further, each of phase set signals can be set per scanning at a position slightly deviated in a prescribed direction from a position set during a previous scanning operation. Thus, since an amount of a phase delay is changed at the above-described timing, a phase of a pixel clock can substantially be changed preventing the adverse effect to an output image quality. Further, if a phase set signal is controlled at each scanning to be changed only at a scanning start timing so that a prescribed amount of a clock fraction is increased or decreased (e.g. ⅛, ⅜, ⅜, ⅘, ⅝, ⅝, ⅞, ⅞), a position of each pixel can be controlled by a unit of one eighth clock cycles. As a result, a screen angle of an image output is finely adjusted and a high quality image can be obtained.

Figure 7:
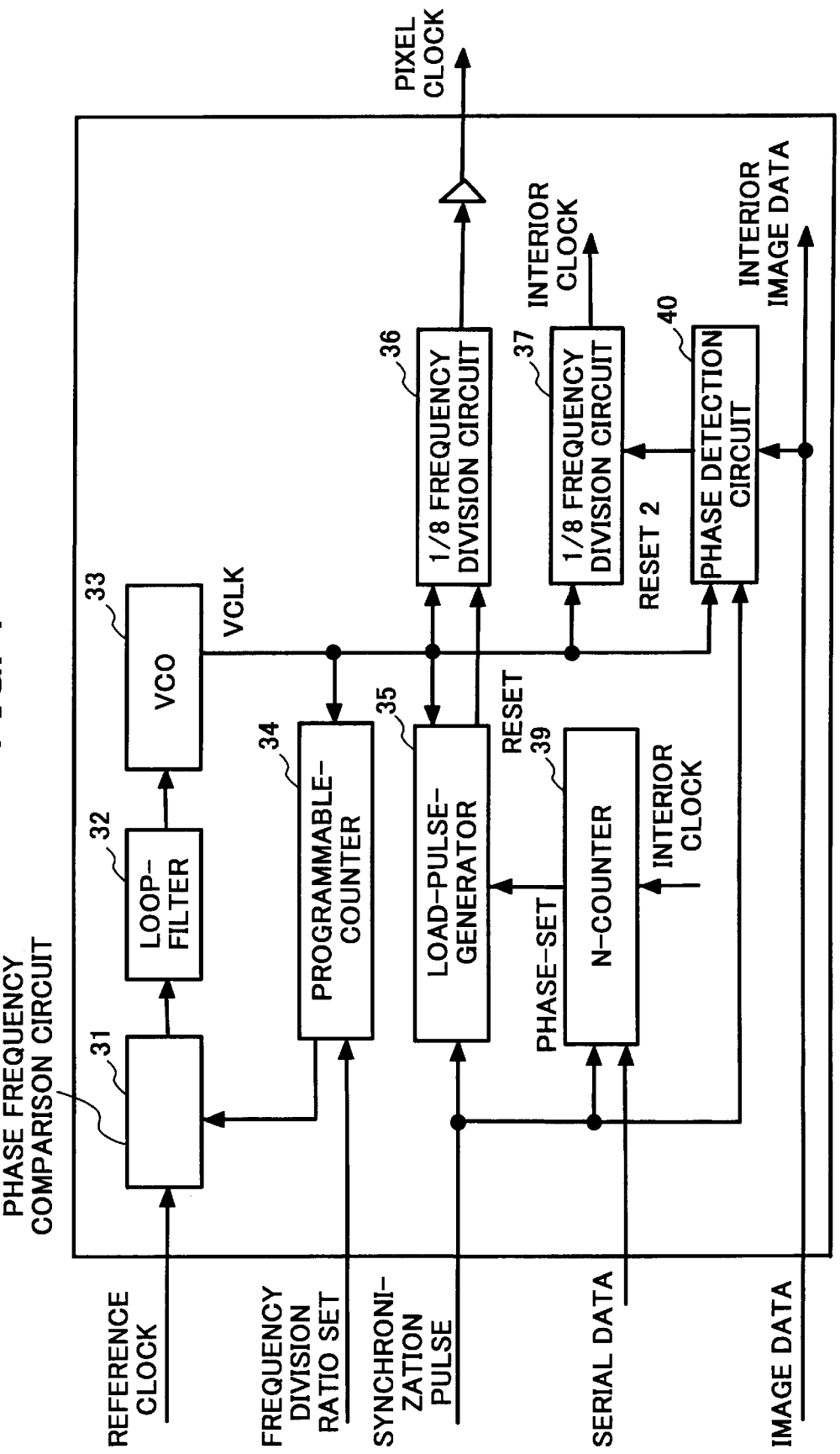
FIG. 7 is a block chart illustrating a phase delaying device having an N-counter for automatically generating a phase set signal per N-counts and delaying a phase of a pixel clock by one eighth according to the present invention.

A modification of the second embodiment is now described with reference to FIG. 7. A phase delay unit for delaying a phase of a pixel clock may include an N-counter 39. The phase delay unit may automatically generate a phase set signal per N counts so as to delay a phase of a pixel clock by one eighth thereof. A count value (N) may be set to the N-counter 39 with serial data. A light modulation pulse may be controlled not to be output during a time period corresponding to the one eighth of the pixel clock. Thus, since a semiconductor laser beam is turned OFF in sufficiently a short time period in relation to a beam diameter thereof at a timing of a contour of a pixel, the exposure energy distribution is not discontinued as illustrated in FIG. 1A. Since the serial data can set a smaller frequency fraction to the N-counter 39 than the PLL, a frequency can equivalently finely be fractionated.

Figure 8:
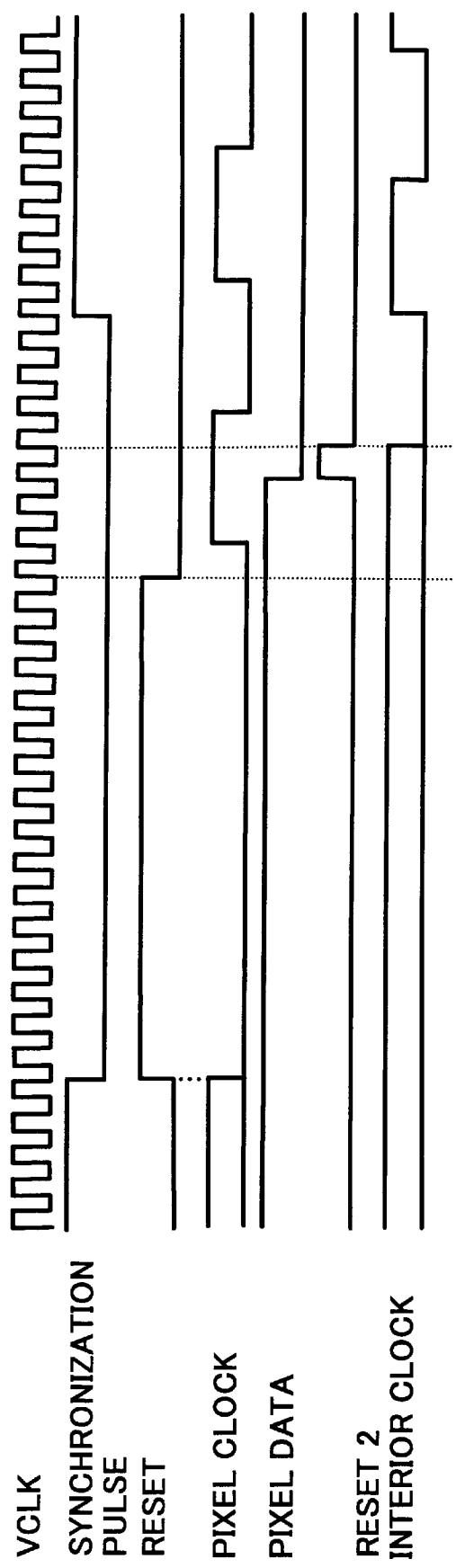
FIG. 8 is a timing chart illustrating a phase of an internal clock in relation to a pixel clock in accordance with phase data according to the present invention.

FIG. 8 illustrates a phase of an internal clock in relation to a pixel clock corresponding to phase data. A VCLK, a synchronization pulse, a reset signal, a pixel clock, image data, and a reset signal 2 may be included in the phase data. The operation of FIG. 8 may be only performed when a phase set signal is at a low level. Thus, the synchronization pulse is validated and a phase relation between the internal clock and the image data is controlled whenever the phase set signal is at the low level. In addition, when an electrical power source is activated and the phase set signal is only set at this timing, a phase lag firstly set can be maintained.

Figure 9:
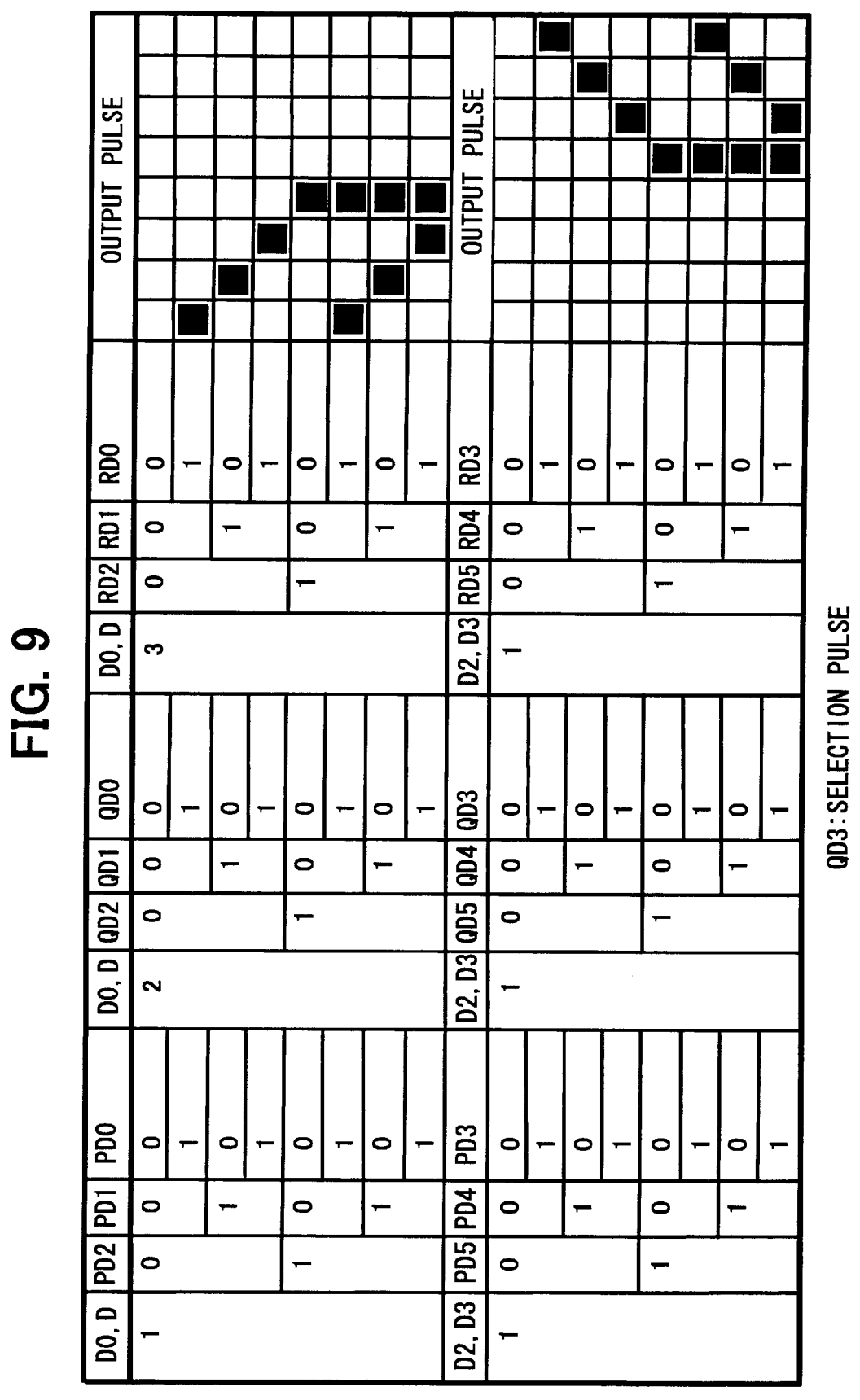
Figure 10:
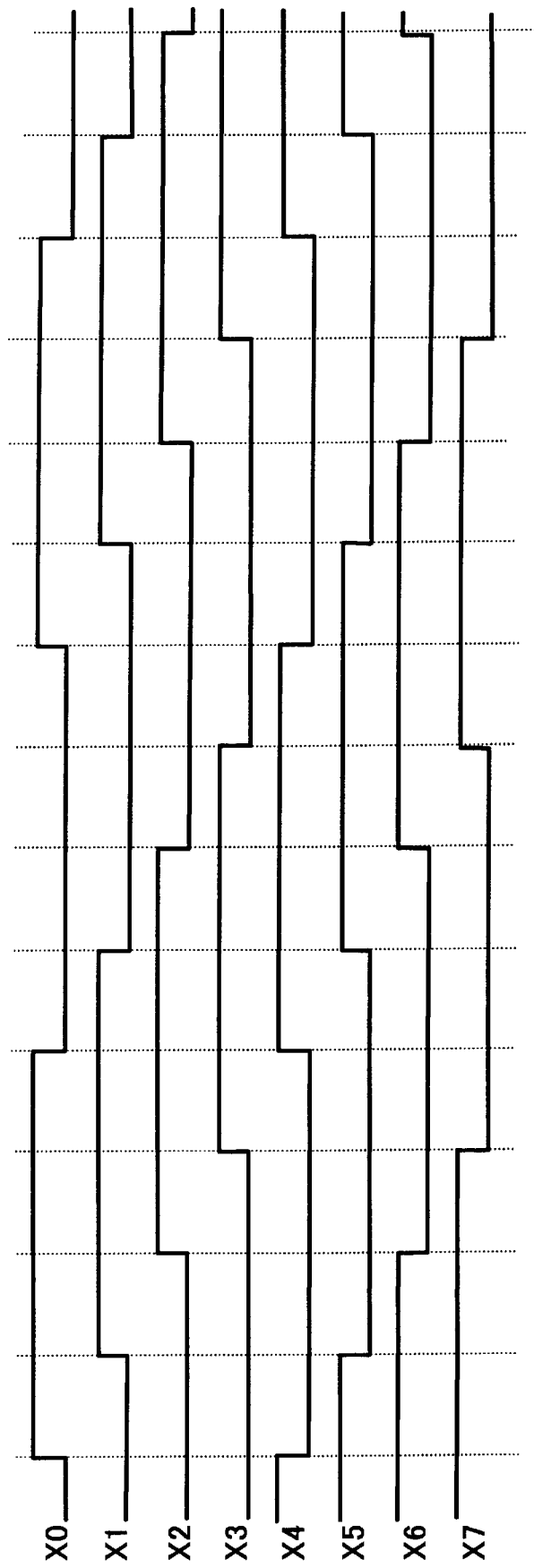
FIG. 10 is a chart illustrating a selection table from which a pulse having eight phases is selected when the VCLK is divided into eight pieces according to the present invention.

FIG. 9 illustrates a modification of the LUT described with reference to FIG. 3 in which a fewer number of bits are utilized. FIG. 10 illustrates a selection table by which eight different phase pulses are selected when a frequency of a VCLK is divided into eight pieces. As noted from FIG. 9, a pair of symmetrical independent pulses can be formed around a center of one pixel and selected from the LUT. In addition, a pulse generation method may be practiced such that a pulse is generated at an optional position by setting the selection table of FIG. 10 to the LUT instead of using the shift register. Thus, even though a selectable pulse series range is narrower when compared with the LUT of FIG. 3, a circuit scale of the LUT can be compact. In addition, the modified LUT may be advantageous if the light modulation pulses illustrated in FIGS. 1B and 2B are to be generated at a low cost.

Figure 11:
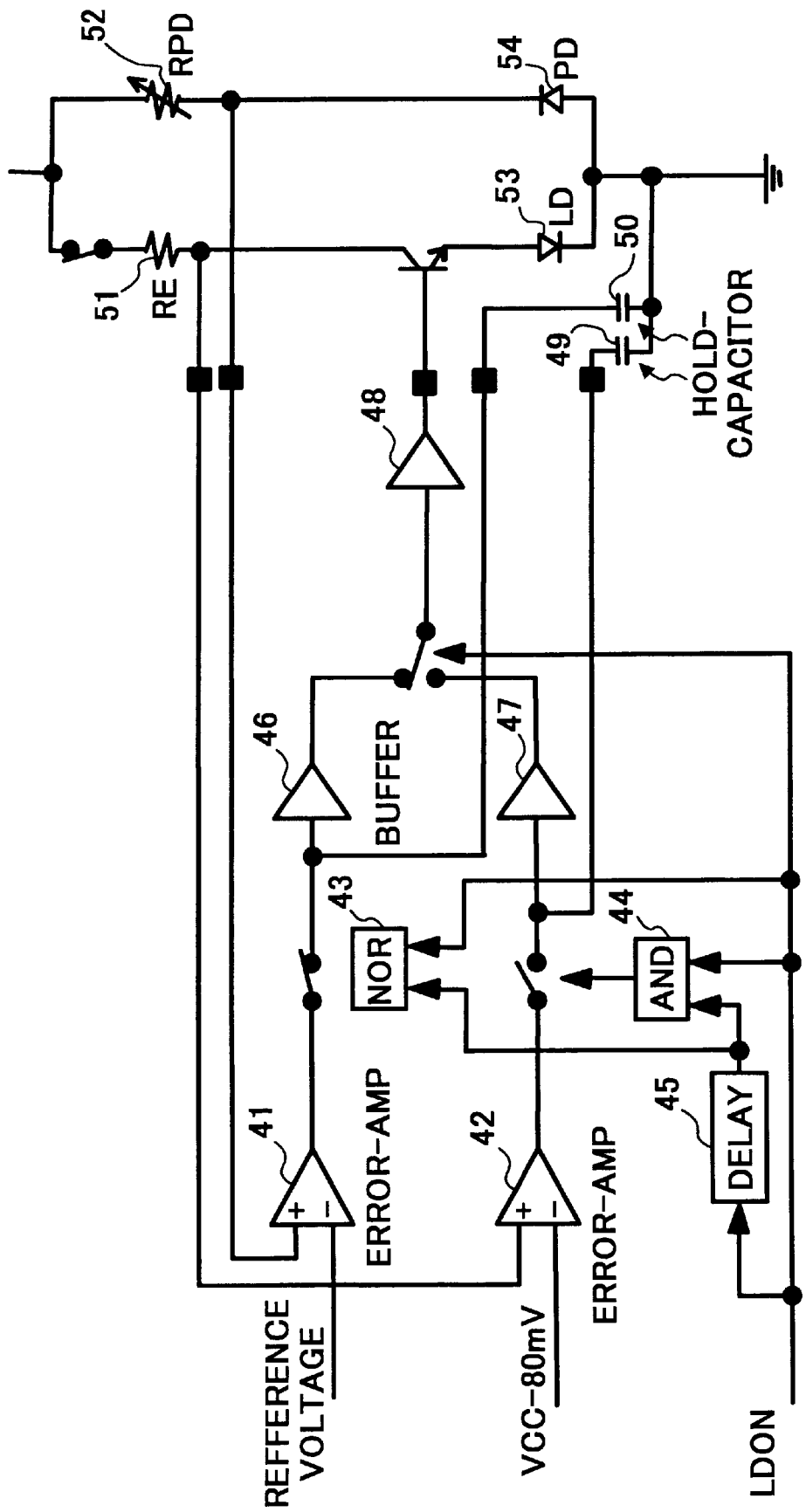
FIG. 11 is a chart illustrating a control circuit which includes a cathode common type semiconductor laser and controls both of a peak value of light output intensity and an amount of a bias current according to the present invention.

FIG. 11 illustrates one example of a control circuit for controlling both of a peak value of a light output intensity and an amount of a bias current carried in a semiconductor laser. A semiconductor laser 53 of a cathode common type may be employed. An error amplifier 41 may be provided to convert and compare a result of light output detection executed by the light receiving element (i.e., photodiode (PD) 54) with a reference voltage. The error amplifier 41 may hold the converted value in a hold capacitor 49 as a control value. To control a terminal voltage of a resistor (RE) 51 at a prescribed amount of voltage (e.g. VCC 80 mV), a control result executed by an error amplifier 42 may be held in hold capacitor 49. A control timing of the error amplifier 41 may be delayed by a prescribed time period when an LD-ON signal for activating the semiconductor laser 53 is active. The error amplifier 42 may delay controlling by a prescribed time period when the LD-ON signal is not active so that the bias current is constant at a prescribed level when the semiconductor laser 53 is turned OFF.

Thus, by delaying a control start by a prescribed time period, an error may be suppressed both when a light output of the semiconductor laser 53 is converted into a light receiving current in the light receiving element and into a voltage, and when a signal is transferred to the error amplifiers 41 or 42. A control timing for the bias current may be performed in a similar manner to the above. In addition, the semiconductor laser 53 may be connected to an emitter of a bipolar transistor so that a base voltage can be conveyed to the semiconductor laser 53 as possible as a delay can be suppressed. Accordingly, a prescribed amount of a light output can be obtained by inducing a prescribed voltage between terminals of the semiconductor laser. As a result, the semiconductor laser 53 can be modulated at a high speed.

Figure 12:
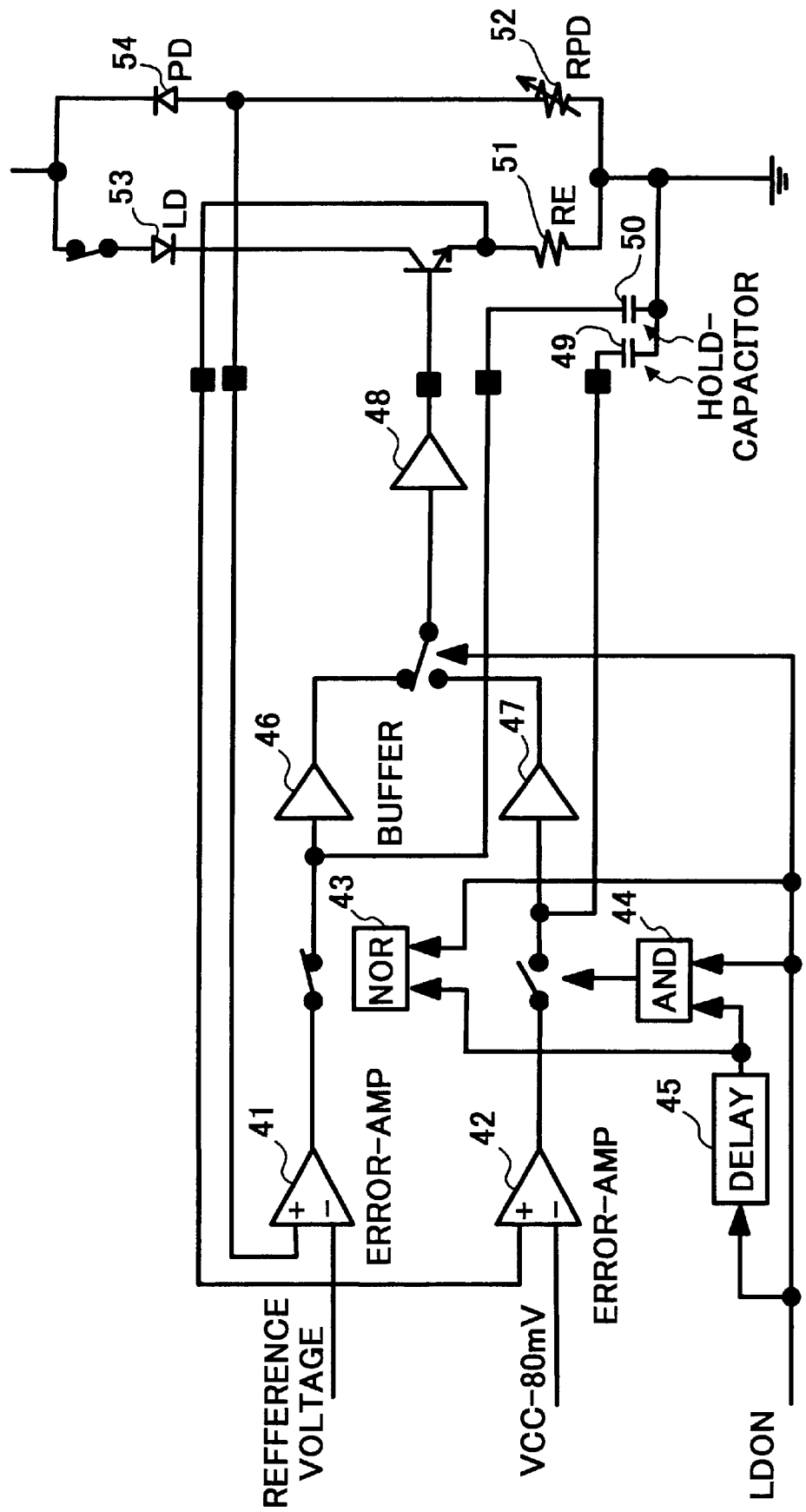
FIG. 12 is a chart illustrating a control circuit which includes an anode common type semiconductor laser and controls both of a peak value of light output intensity and an amount of a bias current according to the present invention.

FIG. 12 illustrates a modification of the control circuit described with reference to FIG. 11. A difference from the control circuit of FIG. 10 may be that the semiconductor laser 53 is an anode common type in this modification. Specifically, the semiconductor laser 53 may be connected to a collector of a transistor. Thus, the modified control circuit can be realized by a similar construction as that of FIG. 10. As a result, both of the types of the semiconductor laser are employable in the same IC.

Figure 13:
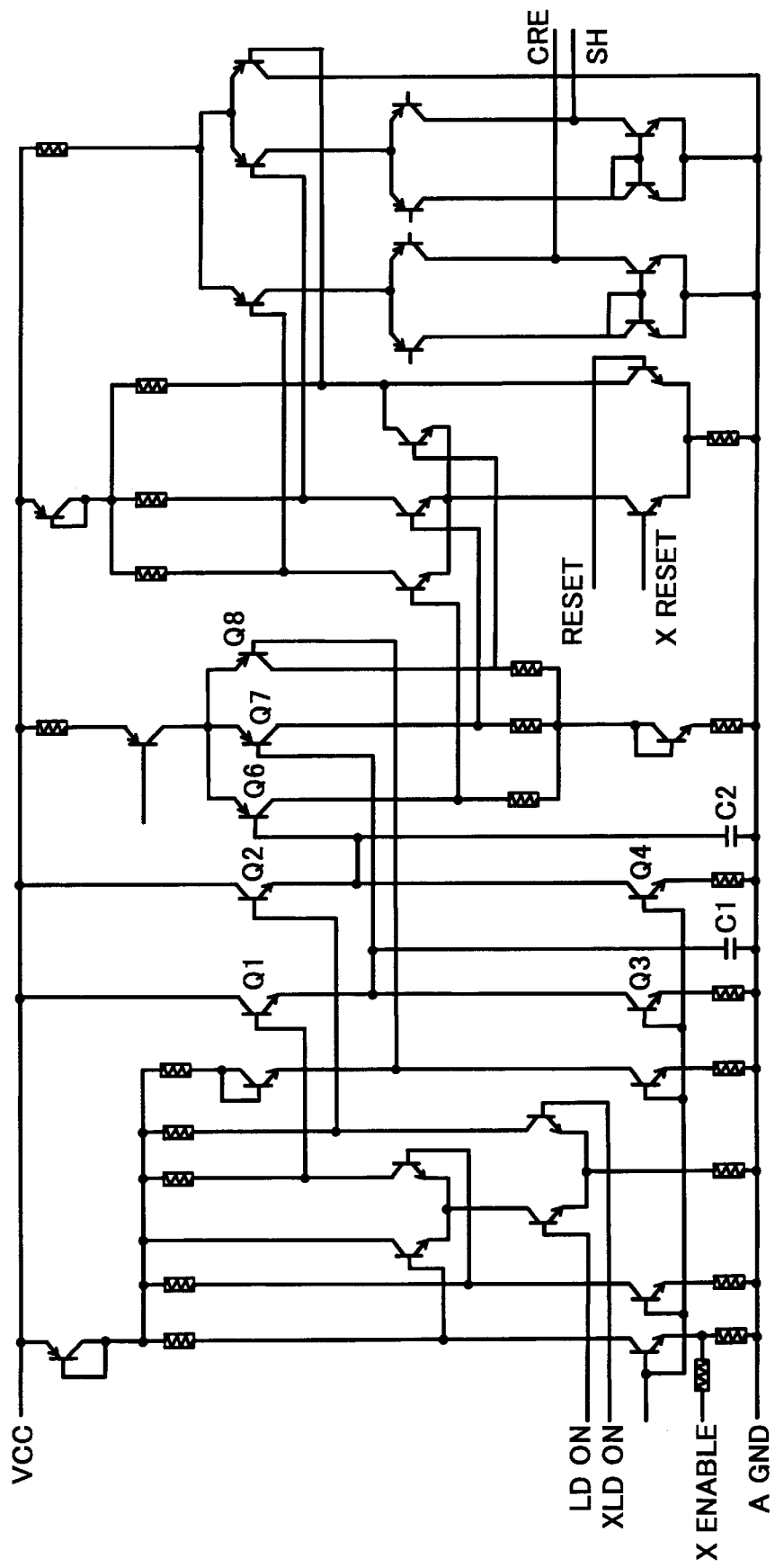
FIG. 13 is a chart illustrating one example of a circuit for generating a timing signal for controlling a semiconductor laser according to the present invention.

FIG. 13 illustrates one example of a timing signal generation circuit for generating a plurality of timing signals for controlling a semiconductor laser. To generate a timing signal for controlling a semiconductor laser, a condenser C1 may quickly be charged when an LD-ON signal is high. To stop controlling when fine pulse series are brought, a load of the condenser C1 may be discharged by a prescribed constant amount of current. Thus, when compared with a simple construction in which a delay circuit is combined with a logic circuit, a control precision may be improved because control values of the fine (i.e., narrow) pulse series are held.

Figure 14:
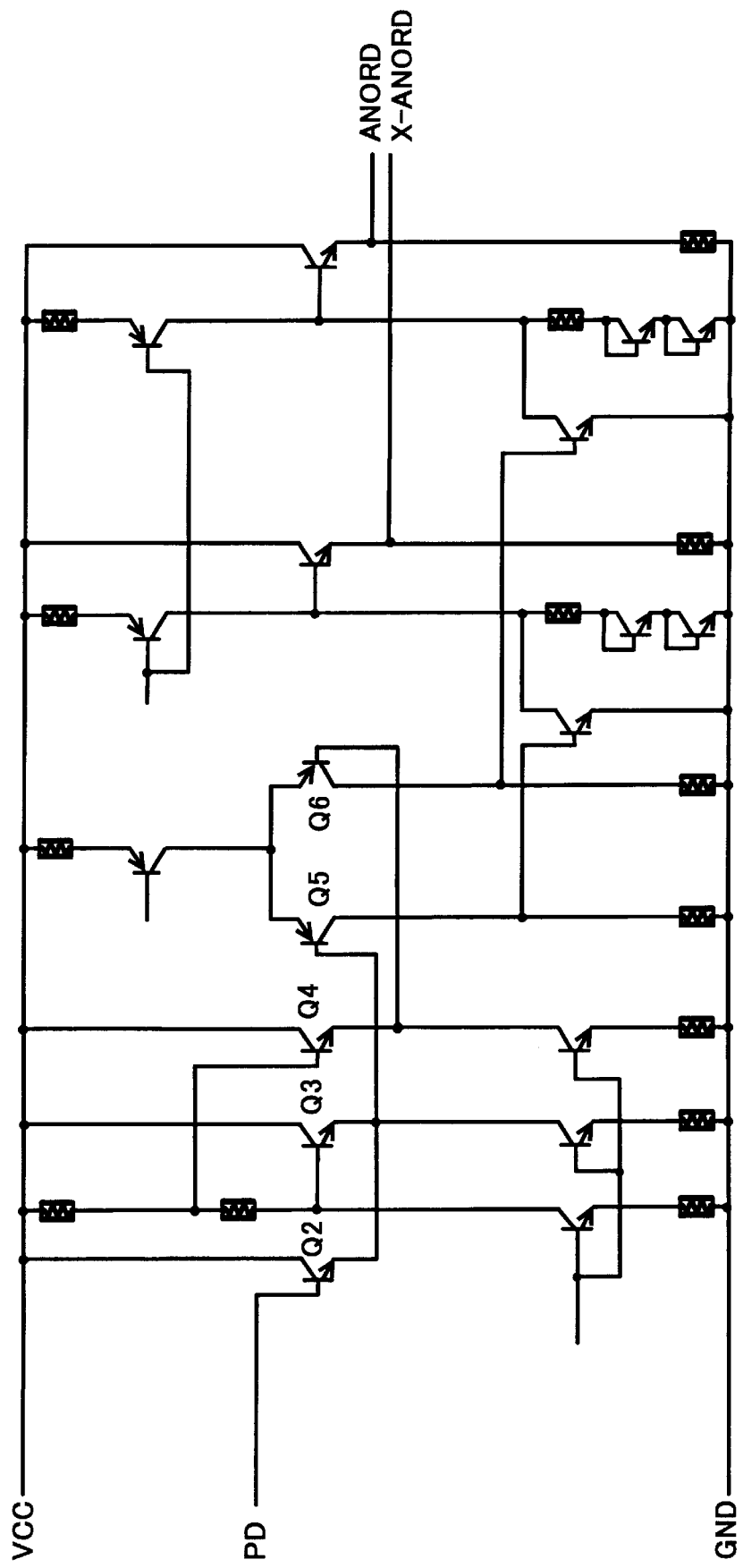
FIG. 14 is a chart illustrating another example of the circuit illustrated in FIG. 13.

FIG. 14 illustrates another example of a timing signal generation circuit for controlling the semiconductor laser. This timing signal generation circuit may recognize which of the semiconductor lasers described with reference to FIGS. 11 and 12 is connected thereto. Specifically, the timing signal generation circuit may refer to characteristics of a terminal voltage of a light receiving element, which detects a light beam of a semiconductor laser, that it varies either from GND (ground) or a VCO as a reference depending upon anode common and cathode common types. Specifically, the timing signal generation circuit can determine that the anode common type is utilized when the terminal voltage is smaller than the amount of VCO/2, and the cathode common type is utilized in another case. Thus, a semiconductor laser type can automatically be recognized and a control manner can correspondingly be changed in accordance with types of a control circuit of FIG. 11 or 12. In addition, substantially the same IC may advantageously be applicable to both of the semiconductor laser types.

Figure 15:
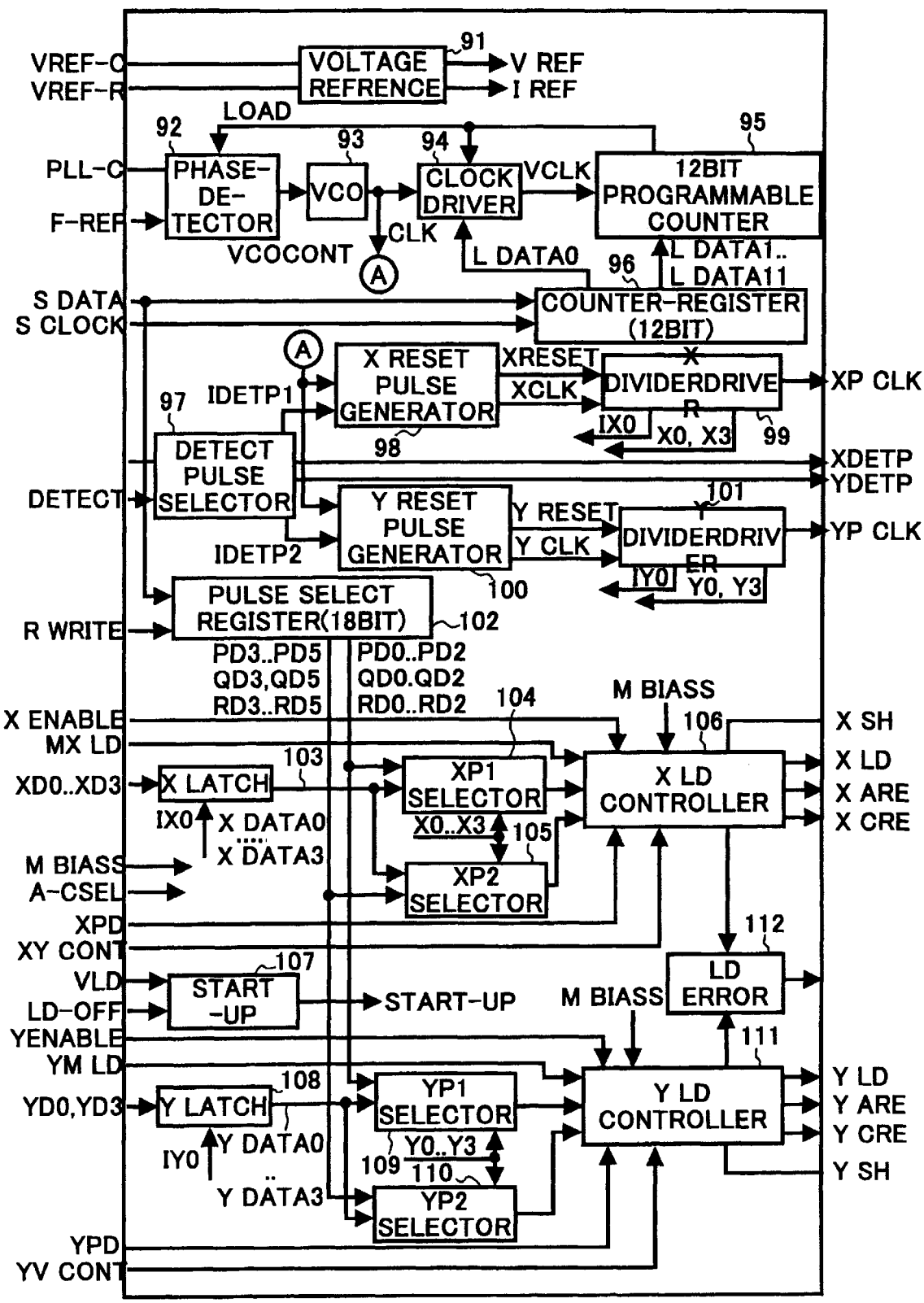
FIG. 15 is a chart illustrating one example of a one chip IC including various control circuits according to the present invention.

FIG. 15 illustrates one example of a one-chip IC that includes the above-described various applicable devices. In the one-chip IC, substantially the same frequency is utilized for a pixel clock. Two types of a synchronization signal may be utilized as independently controllable. In addition, a control circuit for modulating a semiconductor laser may include two channels. A voltage reference 91 may be included as a reference power source supply circuit to supply a reference voltage not only to an entire IC but also to another block of circuits. A phase detector 92, a VCO 93, a clock driver 94, and a programmable counter 95 may be provided to collectively constitute a PLL. Among twelve bits set in a register 96, one bit of a low level may be set so as to delay a phase of an output clock (VCLK) of a clock driver 94 by an amount of (π). In addition, eleven bits of an upper level may set a frequency division ratio for the programmable counter 95.

Thus, a frequency of a CLK may be calculated by the formula (FREF×N/2), wherein the (N) represents twelve bit data. Responsive to each of a DETP1 and a DETP2, both of A(X) and B(Y) reset pulse generators 98 and 100 may output respective A(X) and D(Y) resets, and respective A(X) and B(Y) CLKs which are selectively determined if inverted or not. Both of A(X) and B(Y) divider drivers 99 and 101 may output pixel clocks (i.e., A(X) and B(Y) PCLKs) respectively, in synchronism with A(X)DETP1 and B(Y) DETP2 after the frequencies are divided into four pieces in accordance with the A(X) and B(Y) resets and the A(X) and B(Y) CLKs.

Figure 16:
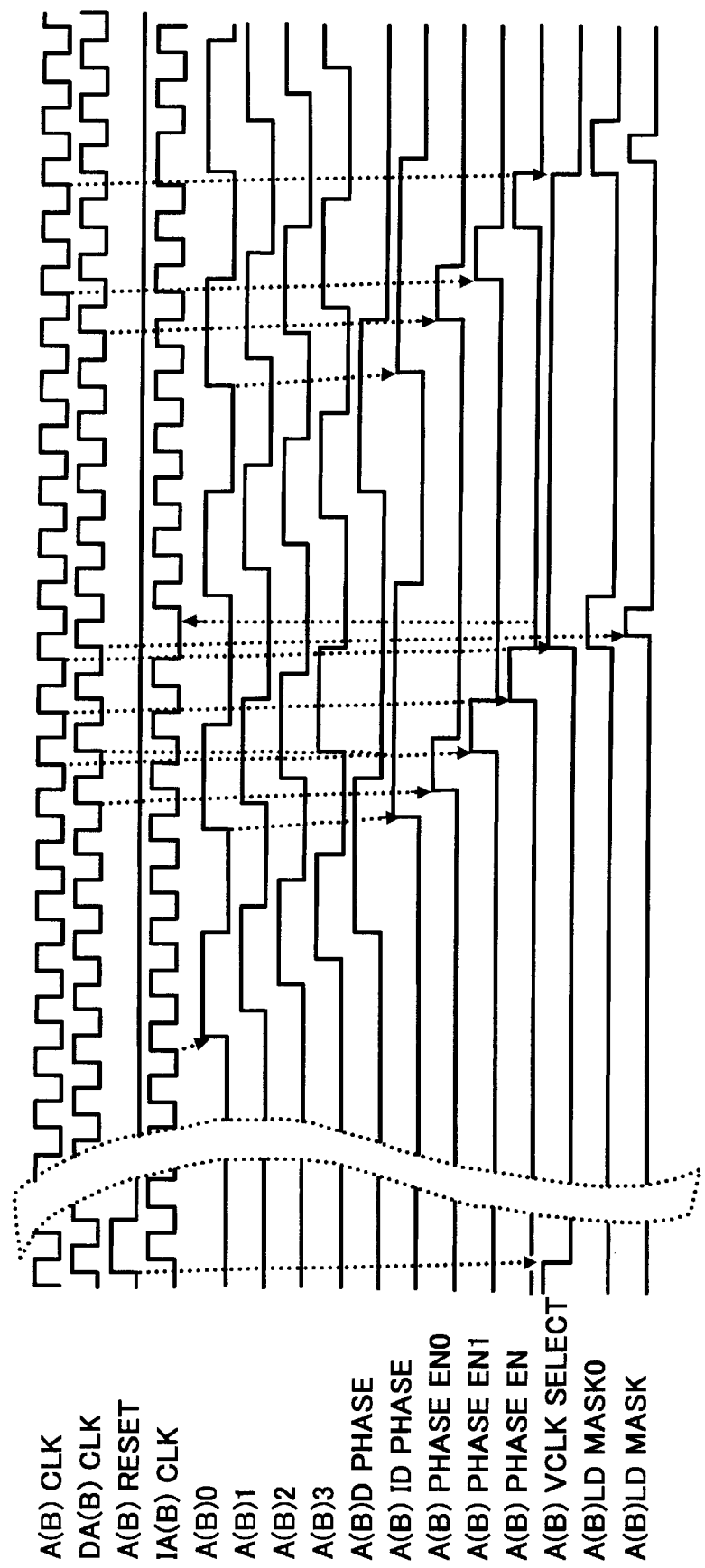
FIG. 16 is a timing chart illustrating one example of an operation for delaying a phase of a pixel clock by one eighth thereof according to the present invention.

FIG. 16 illustrates one example of a timing chart describing a delay of a phase by one eighth. As noted therefrom, a phase of a pixel clock can be delayed by one eighth in accordance with a rising edge of AD or BD phase. As a result, a start position of a pixel clock can be delayed by a cycle of one-eighth phases per line scanning. In addition, when the rising edge is given (M) times during one line scanning time period, a frequency of a pixel clock can equivalently be changed to an amount which is calculated by the following formula: FCLK×N/(N+M/8)

In addition, as noted from FIG. 16, by generating and using both of ALDMASK and BLDMASK signals, a semiconductor laser may automatically forcibly be turned OFF at a timing when the pixel clock is delayed by one eighth clock cycles so that image density does not sharply change. Otherwise, such forcible turning OFF may not be necessitated if density of pixel data is decreased by one eighth. In such a situation, an applicable LDMASK signal may be invalidated by turning a MASK signal to a high level. Otherwise, gradation error caused by an M value fraction of a write clock frequency may be detected and diffused to ambient pixel data when the ambient pixel data is digitized.

The semiconductor laser may be turned off during a time period corresponding to the fraction number M when M is positive, and an intensity of the semiconductor laser may be increased during a time period corresponding to the fraction numbers N plus M when the M is negative.

Figure 17A:
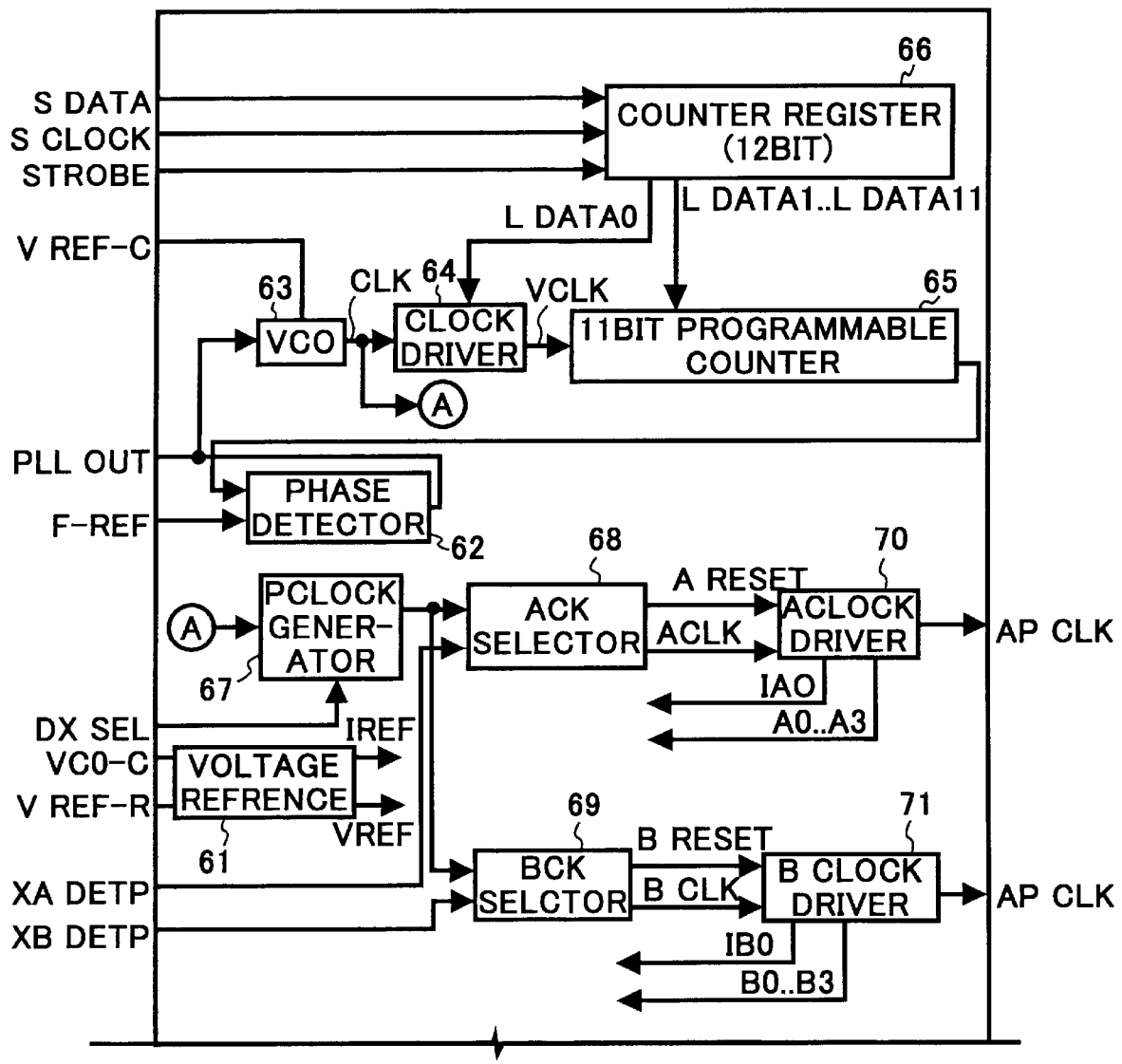
FIG. 17 is a block chart illustrating one example of a light modulation pulse generation device for generating a light modulation pulse in accordance with a predetermined rule according to the present invention.
Figure 17B:
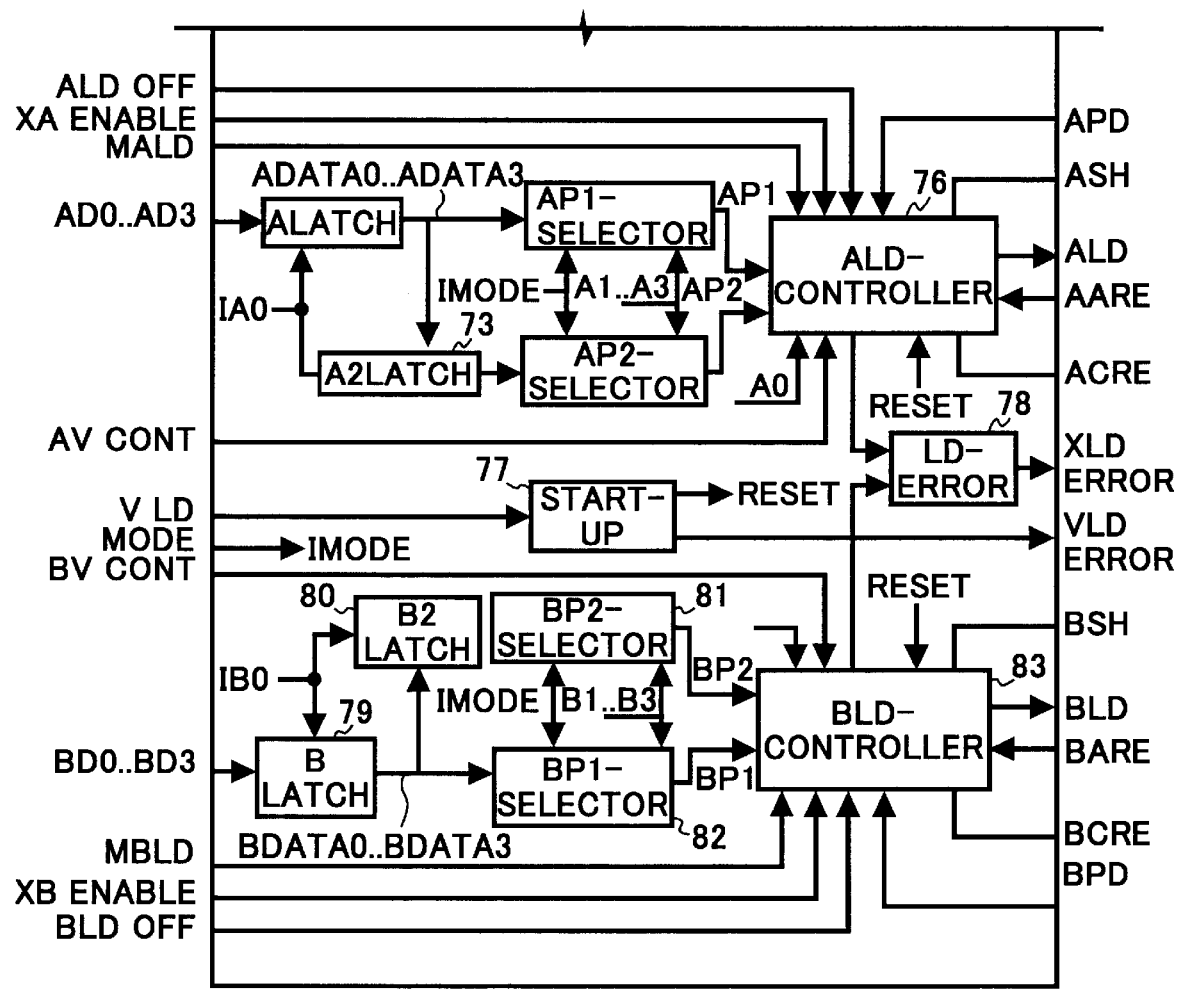

FIGS. 17A and 17B illustrate one example of a construction of a light modulation pulse generator for generating a light modulation pulse for a multi-laser beam in accordance with a predetermined rule.

Figure 18:
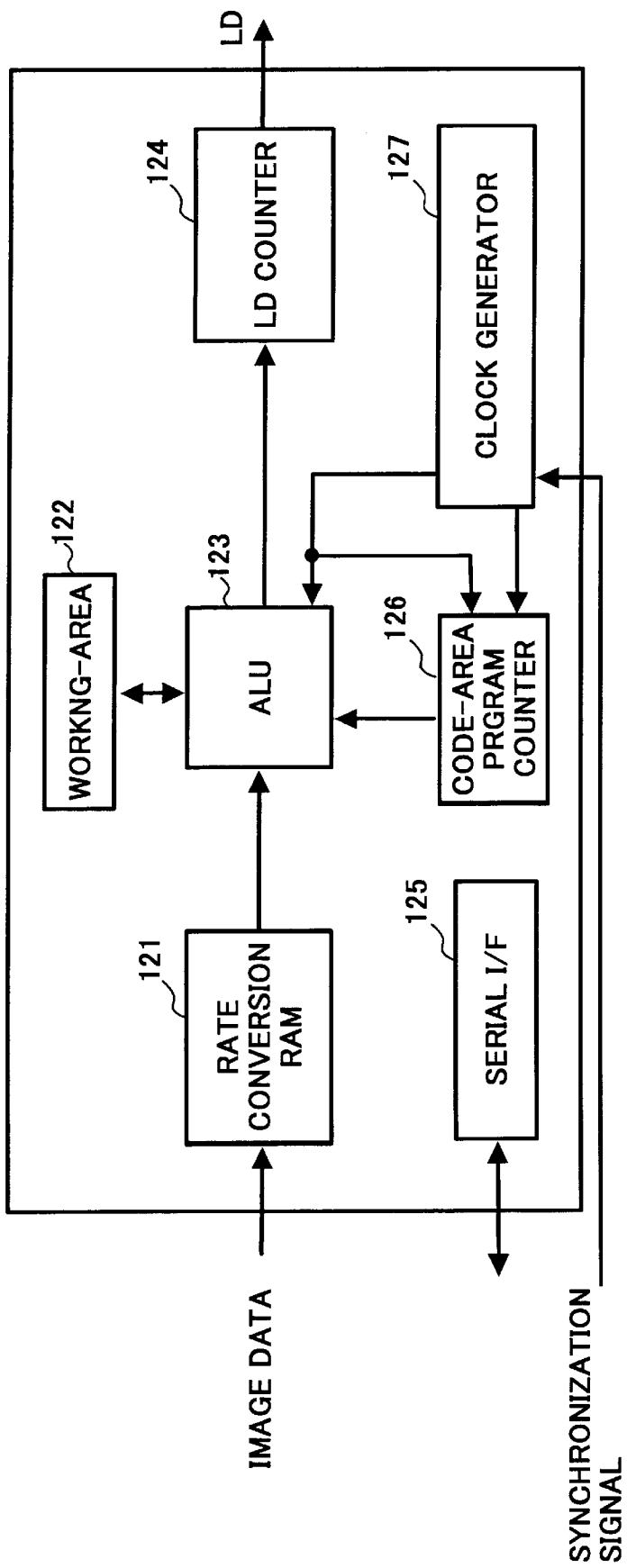
FIG. 18 is a block chart illustrating one example of a pixel data conversion and process unit for converting and processing pixel data according to the present invention.

FIG. 18 illustrates one example of an image data conversion and process unit that realizes the above-described control. As noted therefrom, the image data conversion and process unit may include a serial interface 125 that writes a prescribed program code in a code area 126. The image data conversion and process unit may be enabled by the prescribed program code to generate a density pattern for controlling an electro-photographic process, and detect an isolated point or the like. In addition, an image data conversion and process unit may convert and process image data responsive to the density pattern generation and the isolated point detection during a valid write time period of image data. In addition, an arithmetical logical unit (ALU) 123 may be provided and is operated by an output clock of a clock generator 127 at a frequency of eight times that of a pixel clock.

The program code may be controlled so that a prescribed program count value is obtained per synchronization signal. The ALU 123 may work when the image data transferred thereto is output. Specifically, the ALU 123 may hand a control result to a LD controller 124. The LD controller 124 may then modulate a semiconductor laser in accordance with the control result. A speed conversion RAM 121 may be provided as a buffer memory to absorb a difference in speed between a clock transferred to itself (e.g. IC) and a write clock.

Figure 19:
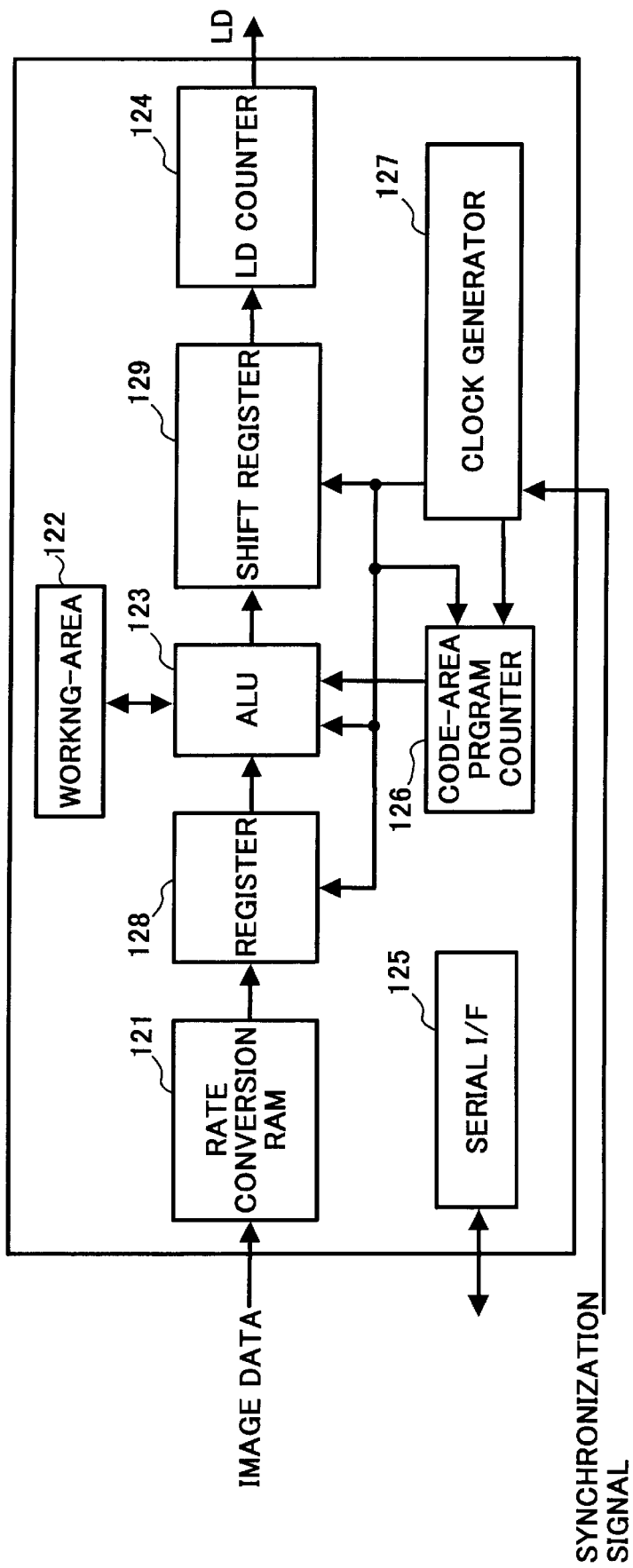
FIG. 19 is a block chart illustrating another example of the pixel data conversion and process unit illustrated in FIG. 18.
Figure 20:
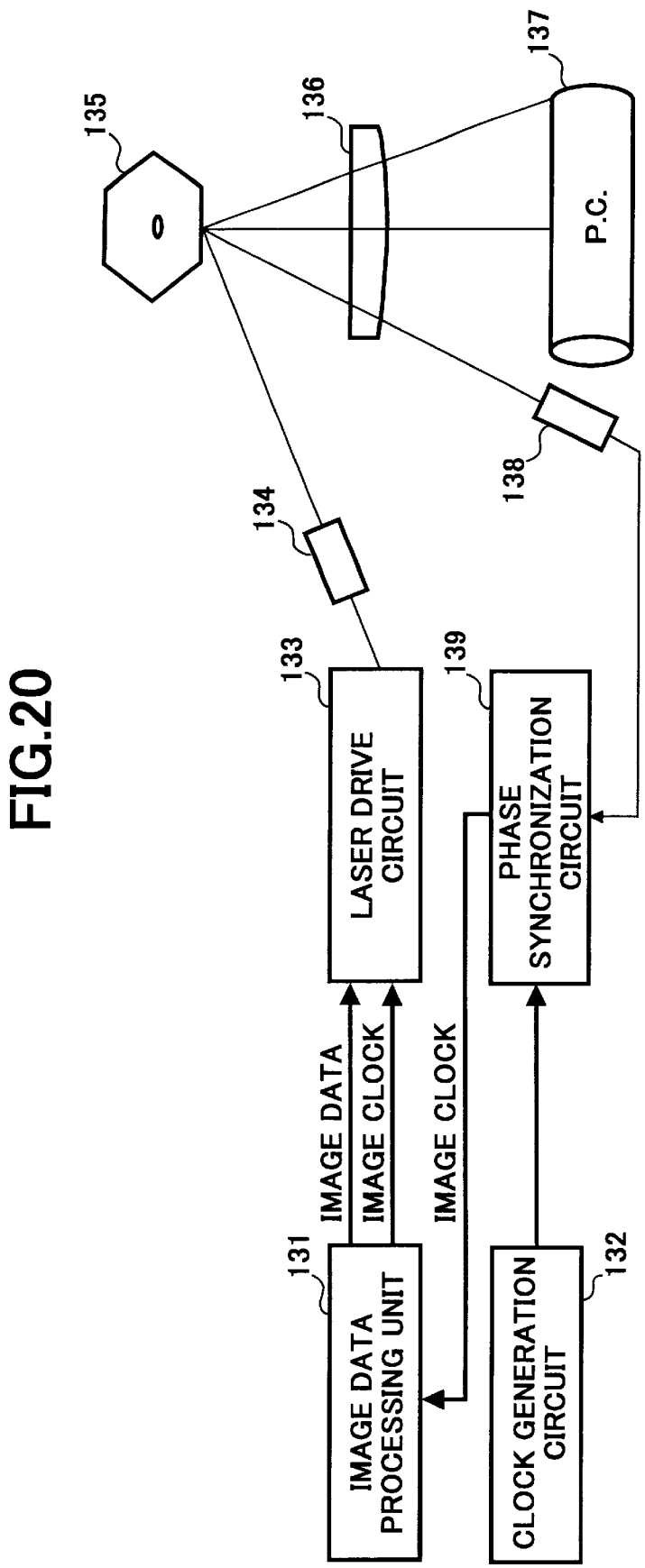
FIG. 20 is a chart illustrating one example of a background image forming apparatus.

FIG. 19 illustrates another example of an image data conversion and process unit. An ALU 123 may write data pattern, which corresponds to a light modulation pattern for one pixel, as an operand to a shift register 129 once per an eight-clock cycle of a clock generator 127. The shift register 129 may hand the modulation data to the LD controller 124 in accordance with the clock of the clock generator 127.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMS, EPROMs, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus, comprising:
    a semiconductor laser configured to irradiate a laser beam modulated based on an image modulation signal;
    a scanning device configured to scan an image carrier with the laser beam;
    a laser beam detection device configured to detect the laser beam, said laser beam detection device being positioned beside the image carrier;
    a latent image formation device configured to form a latent image on the image carrier at a prescribed timing based on a detection signal produced by the laser beam detection device;
    a reference clock generating device configured to generate a reference clock; and
    a pulse modulation device configured to generate a modulation pulse constituting the image modulation signal per one pixel from the reference clock and pixel data, wherein said image modulation pulse includes at least a symmetrical thin pulse series.

2. The image forming apparatus according to claim 1, wherein said image modulation pulse includes a thin center pulse between the symmetrical thin pulse series.

3. An image forming apparatus, comprising:
    a semiconductor laser configured to irradiate a laser beam modulated based on an image modulation signal;
    a scanning device configured to scan an image carrier with the laser beam;
    a laser beam detection device configured to detect the laser beam, said laser beam detection device being positioned beside the image carrier;
    a latent image formation device configured to form a latent image on the image carrier at a prescribed timing based on a detection signal produced by the laser beam detection device; and
    a pixel clock generating device configured to generate a pixel clock, said pixel clock controlling the laser beam;
    wherein said pixel clock includes a plurality of pulses having a prescribed normal width constituted by an output of a control clock divided by a prescribed number of fractions (N) by a frequency division circuit, and substantially periodically includes one or more pulses constituted by a greater width than the normal width by enabling and disabling the frequency division circuit by use of a phase set signal to lengthen the width of the pulse output from the frequency division circuit, said greater width being constituted by the prescribed number of fractions of (N) plus a prescribed amount (M).

4. The image forming apparatus according to claim 3, wherein a gradation error caused by a difference in fraction number (M) is diffused to one or more ambient pixels when the ambient pixels are digitized.

5. The image forming apparatus according to claim 3, wherein an intensity of said semiconductor laser is increased during a time period corresponding to the fraction number (N) plus (M) when the number (M) is negative.

6. An image forming apparatus comprising:
    a semiconductor laser configured to irradiate a laser beam modulated based on an image modulation signal;
    a scanning device configured to scan an image carrier with the laser beam;
    a laser beam detection device configured to detect the laser beam, said laser beam detection device being positioned beside the image carrier;
    a latent image formation device configured to form a latent image on the image carrier at a prescribed timing based on a detection signal produced by the laser beam detection device; and
    a pixel clock generating device configured to generate a pixel clock, said pixel clock controlling the laser beam;
    wherein said pixel clock includes a plurality of pulses having a prescribed normal width constituted by a prescribed number of fractions (N), and substantially periodically includes one or more pulses constituted by a greater width than the normal width, wherein the one or more pulses appear in a main scanning direction, and said greater width being constituted by a number of fractions of (N) plus a prescribed amount (M);
    wherein said semiconductor laser is turned OFF during a time period corresponding to the fraction number (M) when the number (M) is positive.

7. An image forming apparatus, comprising:
    means for irradiating a laser beam modulated based on an image modulation signal;
    means for scanning an image carrier with the laser beam;
    means for detecting the laser beam;
    means for forming a latent image on the image carrier at a prescribed timing based on a detection signal produced by the means for detecting;
    means for generating a reference clock; and
    means for generating a modulation pulse constituting the image modulation signal per one pixel from the means for generating a reference clock and pixel data, wherein said image modulation pulse includes at least a symmetrical thin pulse series.

8. The image forming apparatus according to claim 7, wherein said image modulation pulse includes a thin center pulse between the symmetrical thin pulse series.

9. An image forming apparatus, comprising:
    means for irradiating a laser beam modulated based on an image modulation signal;
    means for scanning an image carrier with the laser beam;
    means for detecting the laser beam;
    means for forming a latent image on the image carrier at a prescribed timing based on a detection signal produced by the means for detecting; and means for generating a pixel clock, said pixel clock controlling the laser beam;

wherein said pixel clock includes a plurality of pulses having a prescribed normal width constituted by an output of a control clock divided by a prescribed number of fractions (N) by a frequency division means, and substantially periodically includes one or more pulses constituted by a greater width than the normal width by enabling and disabling the frequency division means by use of a phase set signal to lengthen the width of the pulse output from the frequency division means, said greater width being constituted by the prescribed number of fractions of (N) plus a prescribed amount (M).

10. The image forming apparatus according to claim 9, wherein a gradation error caused by a difference in fraction number (M) is diffused to one or more ambient pixels when the ambient pixels are digitized.

11. The image forming apparatus according to claim 9, wherein an intensity of said semiconductor laser is increased during a time period corresponding to the fraction number (N) plus (M) when the number (M) is negative.

12. An image forming apparatus comprising:

means for irradiating a laser beam modulated based on an image modulation signal;

means for scanning an image carrier with the laser beam;

means for detecting the laser beam;

means for forming a latent image on the image carrier at a prescribed timing based on a detection signal produced by the means for detecting; and means for generating a pixel clock, said pixel clock controlling the laser beam;

wherein said pixel clock includes a plurality of pulses having a prescribed normal width constituted by a prescribed number of fractions (N), and substantially periodically includes one or more pulses constituted by a greater width than the normal width, wherein the one or more pulses appear in a main scanning direction, and said greater width being constituted by a number of fractions of (N) plus a prescribed amount (M);

wherein said semiconductor laser is turned OFF during a time period corresponding to the fraction number (M) when the number (M) is positive.

13. An image forming method, comprising the steps of:

irradiating a laser beam modulated based on an image modulation signal;

scanning an image carrier with the semiconductor laser beam;

detecting the laser beam;

forming a latent image on the image carrier at a prescribed timing based on a detection signal produced by the laser beam detection device;

generating a reference clock; and generating a modulation pulse constituting the image modulation signal per one pixel from the reference clock and pixel data by including image modulation pulse having at least a symmetrical thin pulse series.

14. The image forming method according to claim 13, wherein said step of generating a modulation pulse further comprises the step of including a thin center pulse between the symmetrical thin pulse series.

15. An image forming method, comprising the steps of:

irradiating a laser beam modulated based on an image modulation signal;

scanning an image carrier with the semiconductor laser beam;

detecting the laser beam;

forming a latent image on the image carrier at a prescribed timing based on a detection signal produced by the laser beam detection device;

generating a pixel clock by including a plurality of pulses having a prescribed normal width constituted by an output of a control clock divided by a prescribed number of fractions (N) by a frequency division circuit, and substantially periodically including one or more pulses constituted by a greater width than the normal width by enabling and disabling the frequency division circuit by use of a phase set signal to lengthen the width of the pulse output from the frequency division circuit, said greater width being constituted by the prescribed number of fractions of (N) plus a prescribed amount (M); and controlling the laser beam by the pixel clock.

16. The image forming method according to claim 15, further comprising the step of detecting and diffusing a gradation error caused by a difference in fraction number (M) to one or more ambient pixels when the ambient pixels are digitized.

17. The image forming method according to claim 15, further comprising the step of increasing intensity of said semiconductor laser during a time period corresponding to the fraction number (N) plus (M) when the number (M) is negative.

18. An image forming method comprising the steps of:

irradiating a laser beam modulated based on an image modulation signal;

scanning an image carrier with the semiconductor laser beam;

detecting the laser beam;

forming a latent image on the image carrier at a prescribed timing based on a detection signal produced by the laser beam detection device;

generating a pixel clock by including a plurality of pulses having a prescribed normal width constituted by a prescribed number of fractions (N) and substantially periodically including one or more pulses constituted by a greater width than the normal width, wherein the one or more pulses appear in a main scanning direction, and said greater width being constituted by a number of fractions of (N) plus a prescribed amount (M);

controlling the laser beam by the pixel clock; and turning OFF said semiconductor laser during a time period corresponding to the fraction number (M) when the number (M) is positive.

* * * * *